(12) United States Patent
Xu et al.

(10) Patent No.: US 12,518,344 B2
(45) Date of Patent: Jan. 6, 2026

(54) METHOD FOR GENERATING A HIGH RESOLUTION IMAGE FROM A LOW RESOLUTION IMAGE BY AN ARBITRARY-SCALE BLIND SUPER RESOLUTION MODEL

(71) Applicant: MEDIATEK INC., Hsin-Chu (TW)

(72) Inventors: Yu-Syuan Xu, Hsinchu (TW); Po-Yu Chen, Hsinchu (TW); Wei-Chen Chiu, Hsinchu (TW); Ching-Chun Huang, Hsinchu (TW); Hsuan Yuan, Hsinchu (TW); Shao-Yu Weng, New Taipei (TW)

(73) Assignee: MEDIATEK INC., Hsinchu (TW)

( * ) Notice: Subject to any disclaimer, the term of this patent is extended or adjusted under 35 U.S.C. 154(b) by 332 days.

(21) Appl. No.: 18/218,017

(22) Filed: Jul. 4, 2023

(65) Prior Publication Data

US 2024/0029203 A1    Jan. 25, 2024

Related U.S. Application Data

(60) Provisional application No. 63/369,082, filed on Jul. 22, 2022.

(51) Int. Cl.
*G06T 3/4076* (2024.01)
*G06T 3/4046* (2024.01)
(Continued)

(52) U.S. Cl.
CPC .......... *G06T 3/4076* (2013.01); *G06T 3/4046* (2013.01); *G06T 3/4053* (2013.01);
(Continued)

(58) Field of Classification Search
CPC ... G06T 3/4076; G06T 3/4046; G06T 3/4053; G06T 3/4084; G06T 5/10; G06T 5/50;
(Continued)

(56) References Cited

U.S. PATENT DOCUMENTS 9,288,395 B2    3/2016    Baer
2011/0032413 A1*  2/2011  Kulkarni ................ G03B 13/36
                                                           348/E5.045
(Continued)

FOREIGN PATENT DOCUMENTS

CN    104769934 B    4/2018
CN    113421190 A    9/2021
(Continued)

OTHER PUBLICATIONS

Zhang, K., Zuo, W., & Zhang, L. (2018). Learning a single convolutional super-resolution network for multiple degradations. In Proceedings of the IEEE conference on computer vision and pattern recognition (pp. 3262-3271); (Year: 2018).*

(Continued)

*Primary Examiner* — Jennifer Mehmood
*Assistant Examiner* — Vaisali Rao Koppolu
(74) *Attorney, Agent, or Firm* — Winston Hsu

(57) ABSTRACT

An arbitrary-scale blind super resolution model has two designs. First, learn dual degradation representations where the implicit and explicit representations of degradation are sequentially extracted from the input low resolution image. Second, process both upsampling and downsampling at the same time, where the implicit and explicit degradation representations are utilized respectively, in order to enable cycle-consistency and train the arbitrary-scale blind super resolution model.

20 Claims, 5 Drawing Sheets

(51) Int. Cl.
| | |
|---|---|
| *G06T 3/4053* | (2024.01) |
| *G06T 3/4084* | (2024.01) |
| *G06T 5/10* | (2006.01) |
| *G06T 5/50* | (2006.01) |
| *G06T 5/70* | (2024.01) |

(52) U.S. Cl.
CPC .............. *G06T 3/4084* (2013.01); *G06T 5/10* (2013.01); *G06T 5/50* (2013.01); *G06T 5/70* (2024.01); *G06T 2207/20064* (2013.01); *G06T 2207/20076* (2013.01); *G06T 2207/20081* (2013.01); *G06T 2207/20084* (2013.01)

(58) Field of Classification Search
CPC .............. G06T 5/70; G06T 2207/20064; G06T 2207/20076; G06T 2207/20081; G06T 2207/20084
See application file for complete search history.

(56) References Cited

U.S. PATENT DOCUMENTS

| | | |
|---|---|---|
| 2020/0034948 A1 | 1/2020 | Park |
| 2020/0226718 A1 | 7/2020 | Reddy |
| 2020/0364556 A1 | 11/2020 | Irani |
| 2022/0122223 A1 | 4/2022 | Choi |
| 2022/0138500 A1 | 5/2022 | Levinshtein |
| 2024/0185386 A1* | 6/2024 | Pan ..................... G06T 3/4046 |

FOREIGN PATENT DOCUMENTS

| | | |
|---|---|---|
| CN | 114202460 A | 3/2022 |
| CN | 114494015 A | 5/2022 |
| TW | 202105241 A | 2/2021 |

OTHER PUBLICATIONS

Fu, Y., Chen, J., Zhang, T., & Lin, Y. (2021). Residual scale attention network for arbitrary scale image super-resolution. Neurocomputing, 427, 201-211; (Year: 2021).*

Hu, X., Mu, H., Zhang, X., Wang, Z., Tan, T., & Sun, J. (2019). Meta-SR: A magnification-arbitrary network for super-resolution. In Proceedings of the IEEE/CVF conference on computer vision and pattern recognition (pp. 1575-1584 (Year: 2019).*

Liang, SwinIR: Image Restoration Using Swin Transformer, IEEE, Aug. 23, 2021.

Wang, Unsupervised Degradation Representation Learning for Blind Super-Resolution, IEEE, Apr. 1, 2021.

Bell-Kligler, Blind Super-Resolution Kernel Estimation using an Internal-GAN, NIPS'19, Jan. 7, 2020.

Luo, Deep Constrained Least Squares for Blind Image Super-Resolution, IEEE, Mar. 25, 2022.

Chen, Learning Continuous Image Representation with Local Implicit Image Function, IEEE, Apr. 1, 2021.

Skorokhodov, Adversarial Generation of Continuous Images, IEEE, Jun. 28, 2021.

Mehta, Modulated Periodic Activations for Generalizable Local Functional Representations, IEEE, Apr. 8, 2021.

Chen, the specification, including the claims, and drawings in the U.S. Appl. No. 18/224,564, filed Jul. 20, 2023.

Zhou et al., "Joint Learning Content and Degradation Aware Embedding for Blind Super-Resolution", Aug. 29, 2022, Proceedings of the 30th ACM International Conference on Multimedia, Association for Computing Machinery, New York, USA.

Liu et al., "Multi-Level Wavelet Convolutional Neural Networks", IEEE Access, Jun. 6, 2019, pp. 74973-74985, vol. 7, Jun. 6, 2019.

Cornillere et al., "Blind Image Super-Resolution with Spatially Variant Degradations", ACM Transactions on Graphics, Nov. 2019, pp. 166:1-166:13, vol. 38, No. 6, Article 166, Nov. 2019.

Zhang et al., "Blind Image Super-Resolution via Contrastive Representation Learning", arXiv:2107.00708v1, Jul. 1, 2021, pp. 1-13, Jul. 1, 2021.

Choi et al., "Wavelet Attention Embedding Networks for Video Super-Resolution", 2020 25th International Conference on Pattern Recognition (ICPR), Milan, Italy, Jan. 2021, pp. 7314-7320, Jan. 2021.

Zou et al., "Joint Wavelet Sub-Bands Guided Network for Single Image Super-Resolution", IEEE Transactions on Multimedia, 2023, pp. 4623-4637, vol. 25, 2023.

Yin et al., "Unsupervised simple Siamese representation learning for blind super-resolution", Engineering Applications of Artificial Intelligence, Jun. 2022, vol. 114, Jun. 2022.

* cited by examiner

METHOD FOR GENERATING A HIGH RESOLUTION IMAGE FROM A LOW RESOLUTION IMAGE BY AN ARBITRARY-SCALE BLIND SUPER RESOLUTION MODEL

CROSS REFERENCE TO RELATED APPLICATIONS

This application claims the benefit of U.S. Provisional Application No. 63/369,082, filed on Jul. 22, 2022. The content of the application is incorporated herein by reference.

BACKGROUND

Deep Neural Networks (DNNs) have achieved remarkable results on single image super resolution (SISR). The goal of SISR is to reconstruct high-resolution (HR) images from their corresponding low-resolution (LR) images. Despite the success, many of the proposed approaches handle SISR based on pre-defined depredation (e.g. bicubic downsampling) and necessitate a distinct deep neural network model for each specific upsampling scale. However, degradation of a low resolution image is unknown in real world. To handle various unknown degradations, upsampling LR images with degradation estimation is more practical. Moreover, upsampling an LR image in a continuous manner via a single model has emerged and attracted considerable attention recently. Therefore, a machine learning model for arbitrary-scale blind super resolution is proposed in this invention to solve the current problem.

SUMMARY

A method for generating a high resolution image from a low resolution image is proposed. At first, retrieve a plurality of low resolution image patches from the low resolution image. Secondly, perform discrete wavelet transform on each low resolution image patch to generate a first image patch with a high frequency on a horizontal axis and a high frequency on a vertical axis, a second image patch with a high frequency on the horizontal axis and a low frequency on the vertical axis, and a third image patch with a low frequency on the horizontal axis and a high frequency on the vertical axis. Third, input the first image patch, the second image patch and the third image patch to an implicit degradation predictor to generate an implicit degradation representation and a contrasting learning loss. Then, input the implicit degradation representation to an explicit kernel estimator to generate an explicit kernel and a kernel loss. In addition, input the implicit degradation representation and the low resolution image to a plurality of residual groups of an arbitrary-scale super resolution module to generate a tensor. Then, input the tensor, coordinates of the each low resolution image patch, and a cell size of the each low resolution image patch to an implicit neural representation of the arbitrary-scale super resolution module to generate a super resolution image with a low resolution size and a super resolution image with a high resolution size. Moreover, perform convolution on the explicit kernel and the super resolution image with a low resolution size to generate a convoluted image. Then, compare the convoluted image with the low resolution image to generate a cycle loss, and compare a ground truth of the high resolution image with the super resolution image with a high resolution size to generate a super loss. At last, minimize the contrasting learning loss and the kernel loss to train the implicit degradation predictor and the explicit kernel estimator, and minimize the cycle loss and the super loss to train the arbitrary-scale super resolution module.

Another method for generating a high resolution image from a low resolution image is proposed. At first, retrieve a plurality of low resolution image patches from the low resolution image. Secondly, perform discrete wavelet transform on each low resolution image patch to generate a first image patch with a high frequency on a horizontal axis and a high frequency on a vertical axis, a second image patch with a high frequency on the horizontal axis and a low frequency on the vertical axis, and a third image patch with a low frequency on the horizontal axis and a high frequency on the vertical axis. Third, input the first image patch, the second image patch and the third image patch to an implicit degradation predictor to generate an implicit degradation representation and a contrasting learning loss. Then, input the implicit degradation representation to an explicit kernel estimator to generate an explicit kernel and a kernel loss. Additionally input the implicit degradation representation to a hyper network to generate a tensor, and input the low resolution image to a feature encoder to generate an embedded feature. Then input the tensor, coordinates of the each low resolution image patch, and the embedded feature to an implicit neural representation to generate a first super resolution image with a low resolution size and a second super resolution image with a high resolution size. Afterwards perform convolution on the explicit kernel and the first super resolution image to generate a convoluted image. Moreover, compare the convoluted image with the low resolution image to generate a cycle loss. After that, compare a ground truth of the high resolution image with the super resolution image with a high resolution size to generate a super loss. At last, minimize the contrasting learning loss and the kernel loss to train the implicit degradation predictor and the explicit kernel estimator, and minimize the cycle loss and the super loss to train the hyper network, the feature encoder and the implicit neural representation.

Another method for generating a high resolution image from a low resolution image is proposed. First, retrieve a plurality of low resolution image patches from the low resolution image. Secondly, perform discrete wavelet transform on each low resolution image patch to generate a first image patch with a high frequency on a horizontal axis and a high frequency on a vertical axis, a second image patch with a high frequency on the horizontal axis and a low frequency on the vertical axis, and a third image patch with a low frequency on the horizontal axis and a high frequency on the vertical axis. Third, input the first image patch, the second image patch and the third image patch to an implicit degradation predictor to generate an implicit degradation representation and a contrasting learning loss. Then, input the implicit degradation representation to an explicit kernel estimator to generate an explicit kernel and a kernel loss. Additionally input the implicit degradation representation to a modulated network to generate a tensor, and input the low resolution image to a feature encoder to generate an embedded feature. Then, input the embedded feature to a synthesizer to generate a synthesized feature. After that, input the tensor, coordinates of the each low resolution image patch, and the synthesized feature to an implicit neural representation to generate a first super resolution image with a low resolution size and a second super resolution image with a high resolution size. Then, perform convolution on the explicit kernel and the first super resolution image to generate a convoluted image. Moreover, compare the convoluted image with the low resolution image to generate a cycle loss. In addition, compare a ground truth of the high resolution image with the second super resolution image to generate a super loss. At last, minimize the contrasting learning loss and the kernel loss to train the implicit degradation predictor and the explicit kernel estimator, and minimize the cycle loss and the super loss to train the modulated network, the feature encoder and the implicit neural representation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
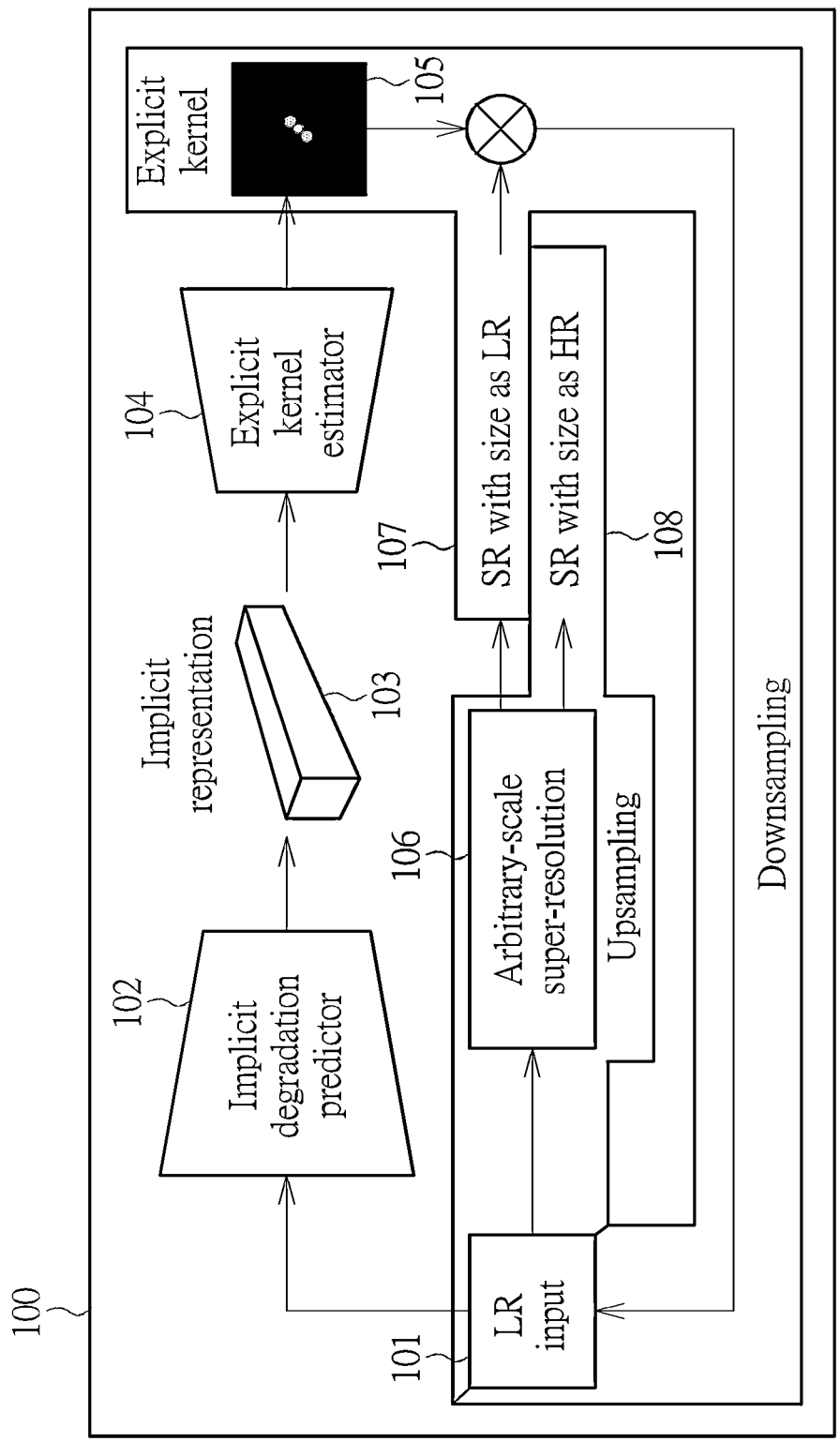
FIG. 1 is a conceptual super resolution model according to an embodiment of the present invention.

FIG. 1 is a conceptual super resolution model 100 according to an embodiment of the present invention. The super resolution model 100 comprises an implicit degradation predictor 102, an explicit kernel estimator 104 and an arbitrary-scale super resolution (ASSR) module 106. A low resolution image 101 is inputted to the implicit degradation predictor 102 to generate an implicit degradation representation 103. Then, the implicit degradation representation is inputted to the explicit kernel estimator 104 to generate an explicit kernel 105. The low resolution image 101 is also inputted to the arbitrary-scale super resolution module 106 to upsample the low resolution image 101 to generate a first super resolution image 107 with a low resolution size and a second super resolution image 108 with a high resolution size. The first super resolution image 107 is further convoluted with the explicit kernel 105 to generate a convoluted image. The second super resolution image 108 is compared with a ground truth of a high resolution image. The conceptual super resolution model 100 shown in FIG. 1 is for tackling arbitrary-scale blind super resolution problem with two main designs. First, utilize both the implicit degradation representation 103 and the explicit kernel 105 for enabling the training objective of cycle-consistency. Second, integrate both upsampling and downsampling processes into a holistic framework for enabling the training objective of cycle-consistency.

Figure 2:
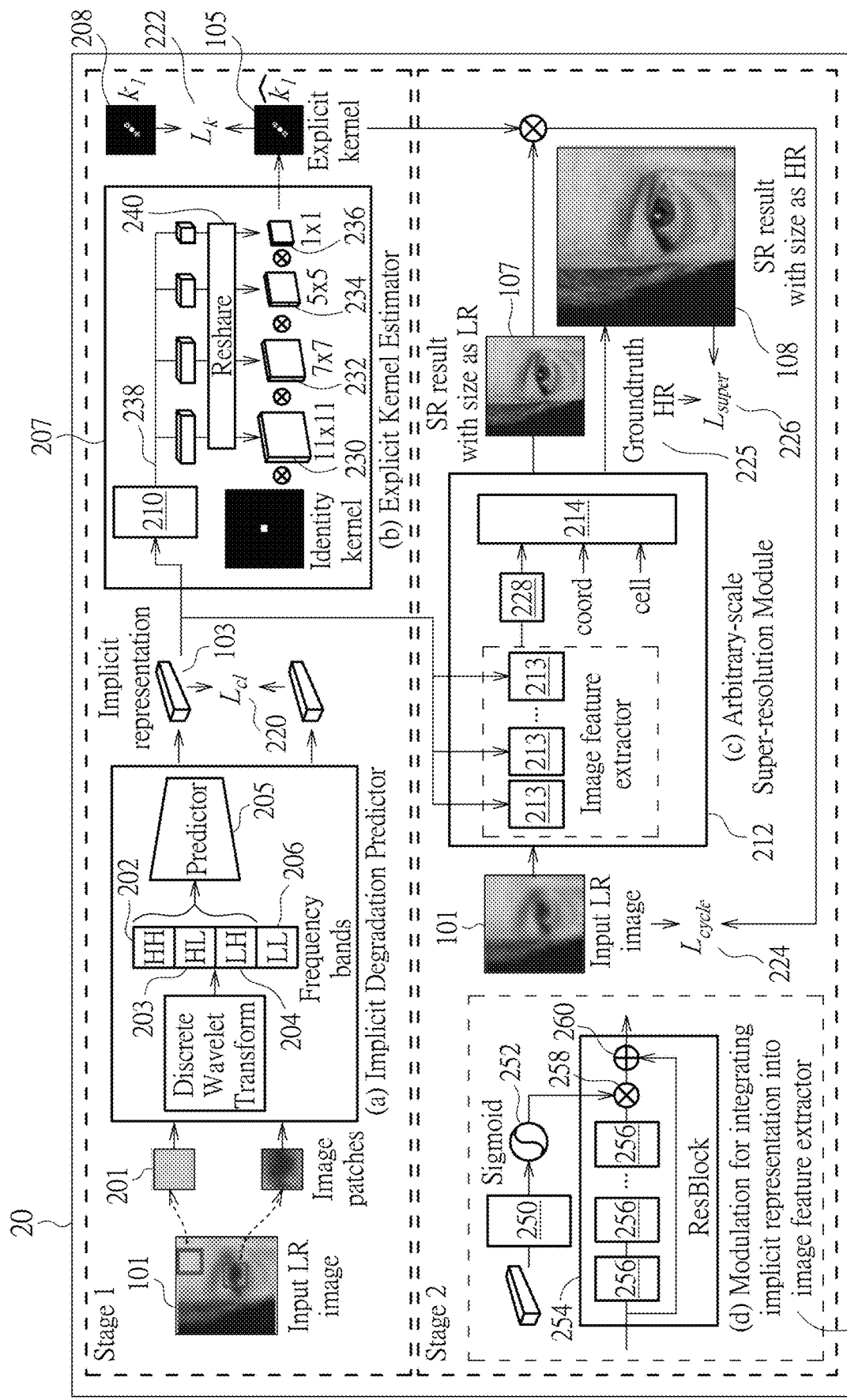
FIG. 2 is a proposed super resolution model according to an embodiment of the present invention.

FIG. 2 is a proposed super resolution model 20 according to an embodiment of the present invention. First, retrieve a plurality of low resolution image patches 201 from the low resolution image 101. Secondly, perform discrete wavelet transform on each low resolution image patch 201 to generate a first image patch 202 with a high frequency on a horizontal axis and a high frequency on a vertical axis, a second image patch 203 with a high frequency on the horizontal axis and a low frequency on the vertical axis, a third image patch 204 with a low frequency on the horizontal axis and a high frequency on the vertical axis, and a fourth image patch 206 with a low frequency on the horizontal axis and a low frequency on the vertical axis. The first image patch 202, the second image patch 203 and the third image patch 204 are inputted to an implicit degradation predictor 205 to generate the implicit degradation representation 103 and a contrasting learning loss 220. Then, input the implicit degradation representation 103 to an explicit kernel estimator 207 to generate the explicit kernel 105 and a kernel loss 222. Moreover, input the implicit degradation representation 103 and the low resolution image 101 to a plurality of residual groups 213 of an arbitrary-scale super resolution module 212 to generate a tensor 228. Then, input the tensor 228, coordinates of the each low resolution image patch, and a cell size of the each low resolution image patch to an implicit neural representation 214 of the arbitrary-scale super resolution module 212 to generate the first super resolution image 107 with the low resolution size and the second super resolution image 108 with the high resolution size. Then, perform convolution on the explicit kernel 105 and the first super resolution image 107 to generate the convoluted image. Moreover, compare the convoluted image with the low resolution image 101 to generate a cycle loss 224. Then, compare the ground truth 225 of the high resolution image with the second super resolution image 108 to generate a super loss 226. At last, in stage 1, the contrasting learning loss 220 and the kernel loss 222 are minimized to train the implicit degradation predictor 205 and the explicit kernel estimator 207. In stage 2, the cycle loss 224 and the super loss 226 are minimized to train the arbitrary-scale super resolution module 212.

The explicit kernel estimator 207 includes fully connected layers 210, and a plurality of convolution filters including an 11×11 convolution filter 230, a 7×7 convolution filter 232, a 5×5 convolution filter 234, and a 1×1 convolution filter 236. At first, project the implicit degradation representation 103 to a lower dimension using two of the fully connected layers 210 to generate a representation with the lower dimension. Secondly, process the representation with the lower dimension through four of the fully connected layers to generate a processed representation 238. Then, reshape the processed representation 238 to generate four reshaped representations 240. At last, perform convolutions on a 41×41 identity kernel with each of the four reshaped representations 240 through the 11×11 convolution filter 230, the 7×7 convolution filter 232, the 5×5 convolution filter 234, and the 1×1 convolution filter 236 respectively to derive the explicit kernel 105. After the explicit kernel 105 is derived, compare the explicit kernel 105 with a ground truth 208 of an ideal kernel to generate the kernel loss 222.

Each of the residual groups 213 in the arbitrary-scale super resolution module 212 includes fully connected layers 250, a sigmoid function 252, and a residual block 254. The method of inputting the implicit degradation representation 103 and the low resolution image 101 to the plurality of residual groups 213 to generate the tensor 228 includes a plurality of steps. At first, input the implicit degradation representation 103 to the fully connected layers 250 of a first residual group 213 of the plurality of residual groups 213 to generate a first representation output of the first residual group 213. Secondly, input the first representation output of the first residual group 213 to a sigmoid function 252 to generate a second representation output of the first residual group 213. Then, input the low resolution image and the second representation output to the residual block 254 of the first residual group 213 to generate a first residual output. The residual block 254 comprises a plurality of convolution layers 256, a channel-wise weighting layer 258, and an add layer 260. After that, input the low resolution image 101 to the plurality of convolution layers 256 to generate a convoluted result. Then, perform channel-wise weighting on the convoluted result in the channel-wise weighting layer 258 according to the second representation output to generate a weighted result. At last, add the weighted result with the low resolution image in the add layer 260 to generate the first residual output.

After generating the first residual output, input the implicit degradation representation 103 to fully connected layers 250 of an nth residual group 213 of the plurality of residual groups 213 to generate a first representation output of the nth residual group 213. Then, input the first representation output of the nth residual group 213 to the sigmoid function 252 to generate a second representation output of the nth residual group 213. After that, input the (n−1)th residual output and the second representation output of the nth residual group 213 to a residual block 254 of the nth residual group 213 to generate an nth residual output wherein n is an integer, and 1<n≤N. The residual block 254 includes a plurality of convolution layers 256, a channel-wise weighting layer 258, and an add layer 260. Input the (n−1)th residual output to the plurality of convolution layers 256 to generate a convoluted result. Then, perform channel-wise weighting on the convoluted result in the channel-wise weighting layer 258 according to the second representation output of the nth residual group 213 to generate a weighted result. At last, add the weighted result with the (n−1)th residual output in the add layer 260 to generate the nth residual output. Note that the Nth residual output is the tensor 228.

An embodiment of this invention for the arbitrary scale blind super resolution task is composed of the implicit degradation predictor 205, explicit kernel estimator 207, and arbitrary scale super resolution module 212. The low resolution image 101 is firstly inputted through the implicit degradation predictor 205 to derive the implicit degradation representation 103, then the implicit representation 103 is not only adopted to estimate the explicit kernel 105 in low resolution space by using the explicit kernel estimator 207, but also taken as the condition for arbitrary-scale super resolution module 212 to output the first super resolution image 107 and the second super resolution image 108. The manner of integrating the implicit representation 103 in the arbitrary scale super resolution module 212 is based on having the residual groups 213 of the arbitrary scale super resolution module 212 built upon stacks of residual blocks 254. Moreover, the first super resolution image 107 is further convolved with the explicit kernel 105 in the low resolution space, where an upsampling-downsampling cycle is therefore formed and it is experimentally shown to be beneficial for the overall model training.

Figure 3:
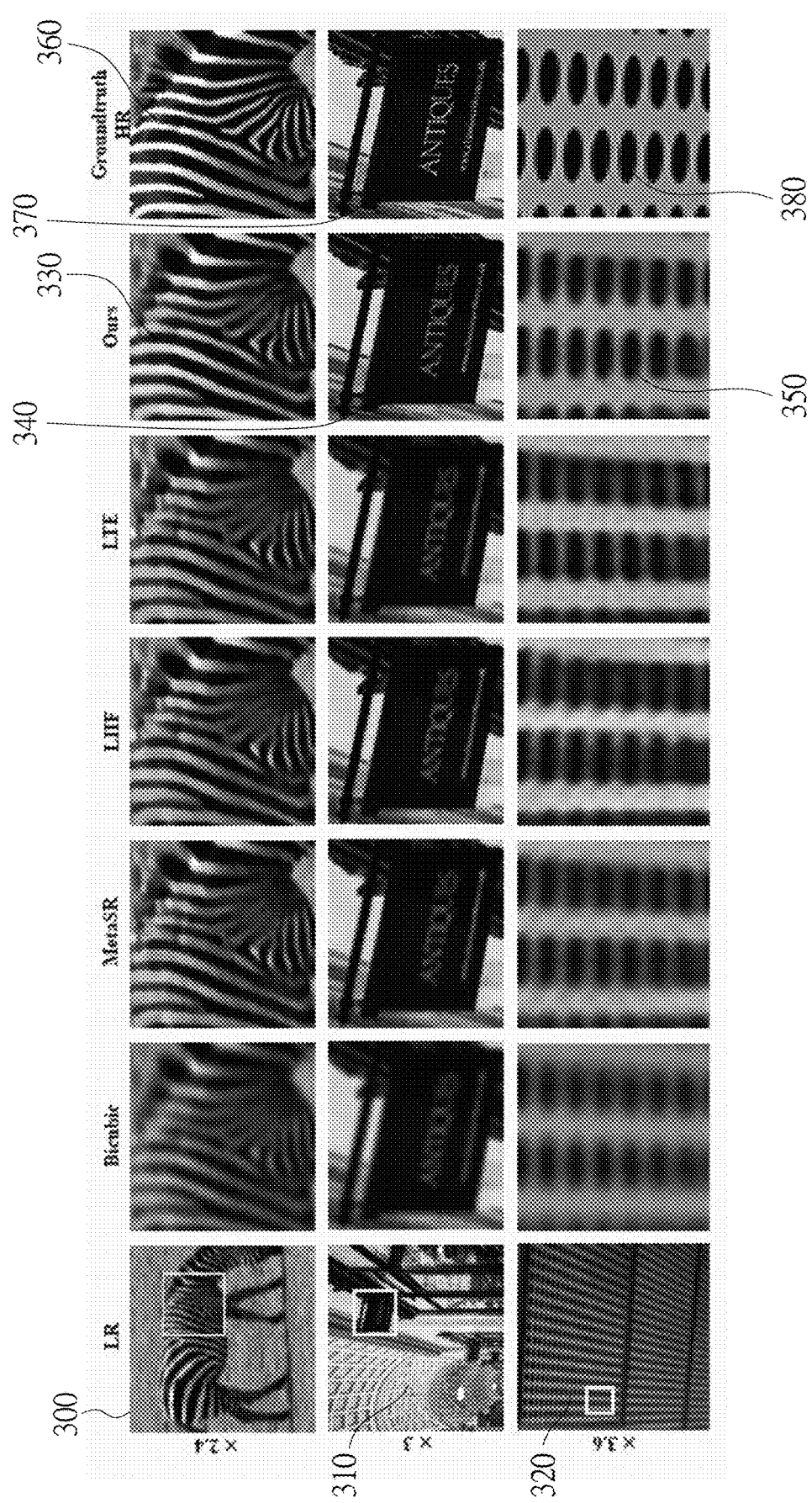
FIG. 3 shows a comparison among super resolution images developed by using various models.

FIG. 3 shows a comparison among the super resolution images developed by using various models. Low resolution images 300, 310, and 320 are fed into the various models for outputting the super resolution images as shown in FIG. 3. The super resolution images of the proposed super resolution model 20 is shown in 330, 340, and 350, which are more similar to the ground truths of high resolution images 360, 370, and 380 than the super resolution images generated by other models. The super resolution image generated by Meta super resolution model (MetaSR) suffers from blocky effect, especially when the scale becomes larger. Local Implicit Image Function (LIIF) and Local Texture Estimator (LTE) are prone to diffuse the color to the surrounding area. The proposed super resolution model 20 generates better line and contour details, showing better ability on restoring high-frequency information, and produces results that are visually most similar to the ground truths of high resolution images.

Figure 4:
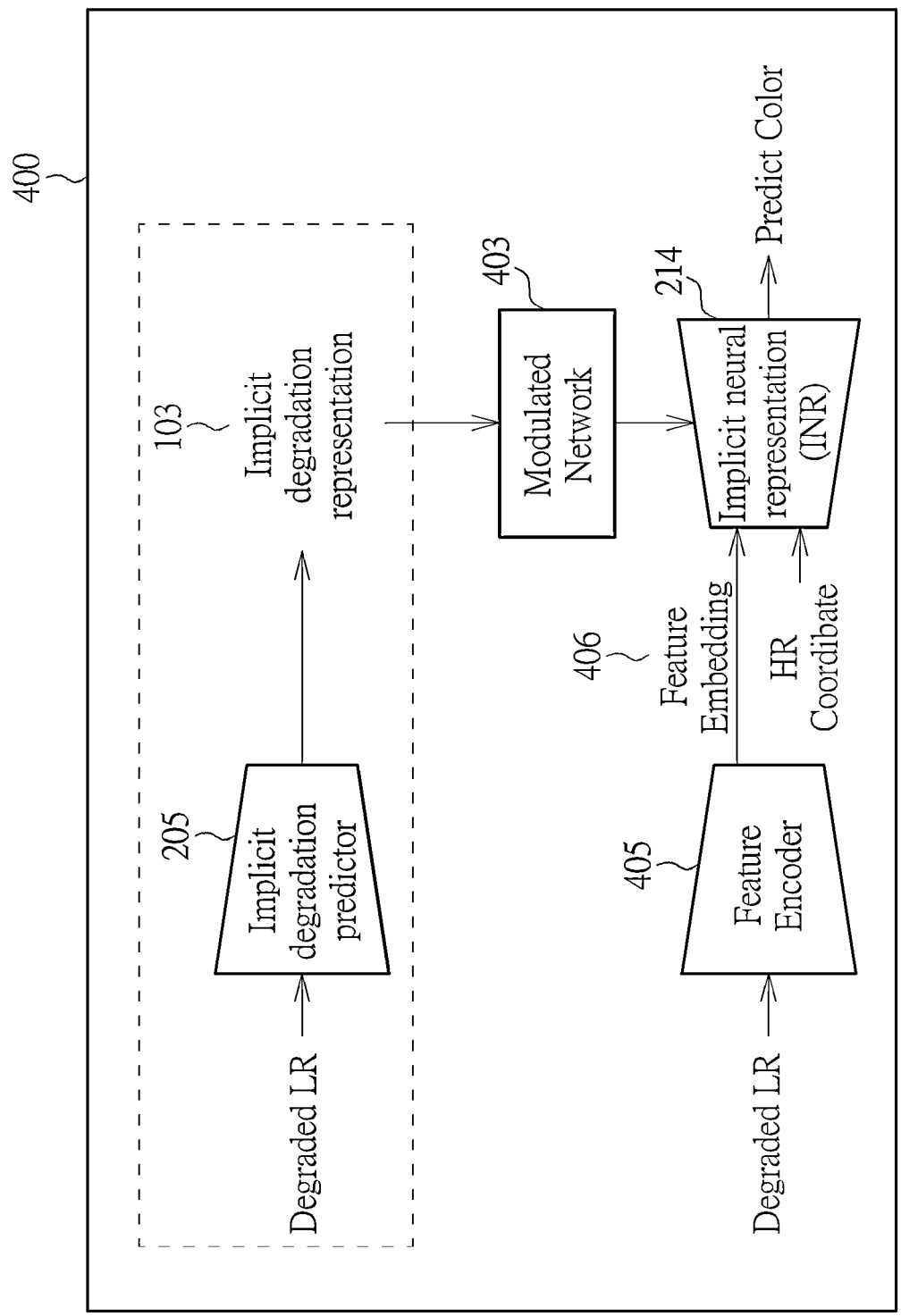
FIG. 4 is a proposed super resolution model according to another embodiment of the present invention.

FIG. 4 is a proposed super resolution model 400 of another embodiment according to the present invention. At first, retrieve a plurality of low resolution image patches 201 from the low resolution image 101. Secondly, perform discrete wavelet transform on each low resolution image patch 201 to generate a first image patch 202 with a high frequency on a horizontal axis and a high frequency on a vertical axis, a second image patch 203 with a high frequency on the horizontal axis and a low frequency on the vertical axis, a third image patch 204 with a low frequency on the horizontal axis and a high frequency on the vertical axis, and a fourth image patch 206 with a low frequency on the horizontal axis and a low frequency on the vertical axis. Then, input the first image patch 202, the second image patch 203 and the third image patch 204 to an implicit degradation predictor 205 to generate an implicit degradation representation 103 and a contrasting learning loss 220. Then, input the implicit degradation representation 103 to an explicit kernel estimator 207 to generate an explicit kernel 105 and a kernel loss 222. Additionally input the implicit degradation representation 103 to a hyper network 403 to generate a tensor 228, and input the low resolution image 101 to a feature encoder 405 to generate an embedded feature 406. Then, input the tensor 228, coordinates of each low resolution image patch 201, and the embedded feature 406 to an implicit neural representation 214 to generate a first super resolution image 107 with a low resolution size and a second super resolution image 108 with a high resolution size. Moreover, perform convolution on the explicit kernel 105 and the first super resolution image 107 to generate a convoluted image. Then, compare the convoluted image with the low resolution image 101 to generate a cycle loss 224, and compare the ground truth 225 of the high resolution image with the second super resolution image 108 to generate a super loss 226. At last, minimize the contrasting learning loss 220 and the kernel loss 222 to train the implicit degradation predictor 205 and the explicit kernel estimator 207, and minimize the cycle loss 224 and the super loss 226 to train the hyper network 403, the feature encoder 405 and the implicit neural representation 214. The difference between the proposed super resolution model 400 and the proposed super resolution model 20 is that in the proposed super resolution model 400, the implicit degradation representation 103 is inputted to the hyper network 403 to generate the tensor 228.

Figure 5:
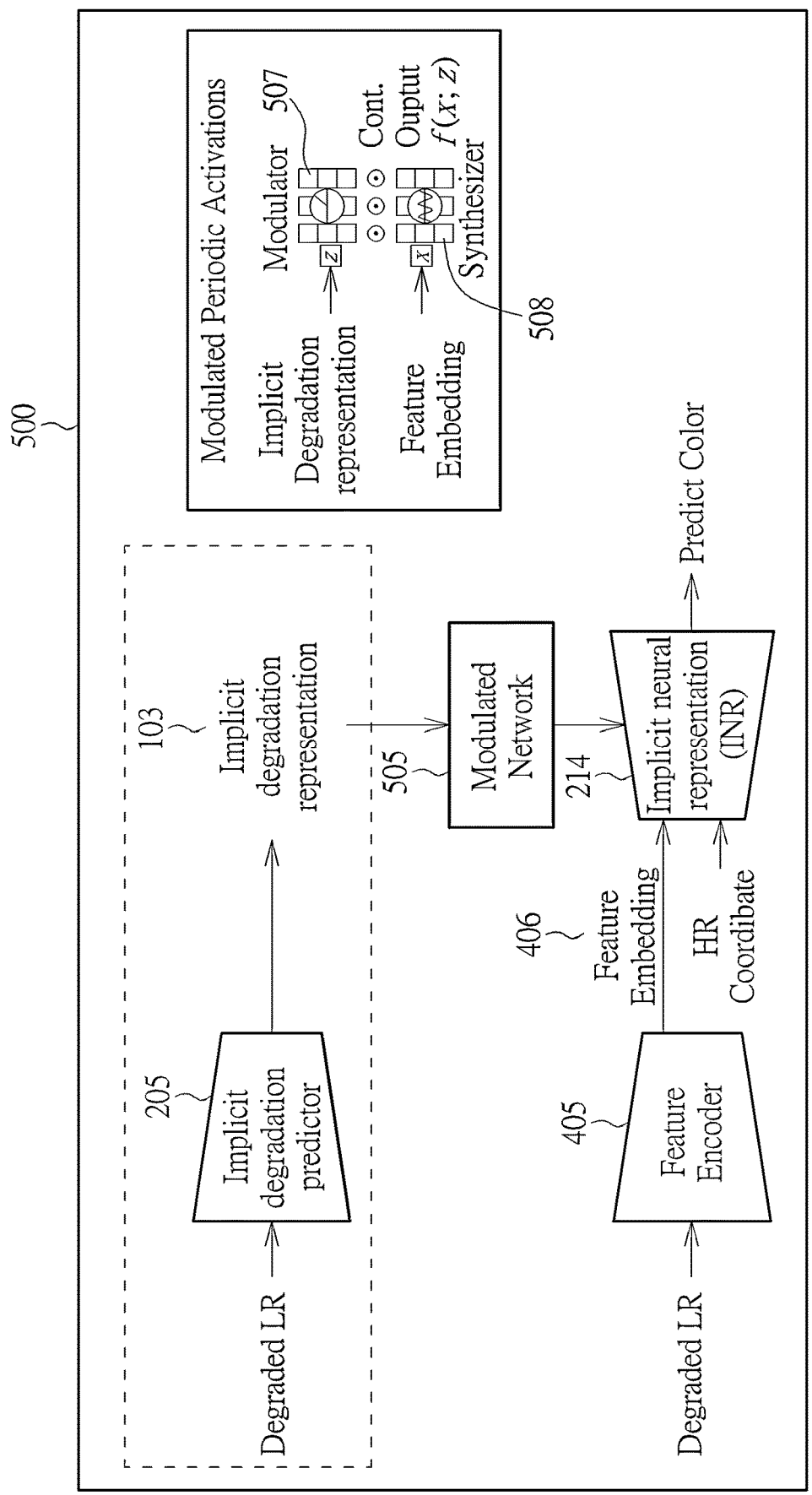
FIG. 5 is a proposed super resolution model according to another embodiment of the present invention.

FIG. 5 is a proposed super resolution model 500 of another embodiment according to the present invention. At first, retrieve a plurality of low resolution image patches 201 from the low resolution image 101. Secondly, perform discrete wavelet transform on each low resolution image patch 201 to generate a first image patch 202 with a high frequency on a horizontal axis and a high frequency on a vertical axis, a second image patch 203 with a high frequency on the horizontal axis and a low frequency on the vertical axis, a third image patch 204 with a low frequency on the horizontal axis and a high frequency on the vertical axis, and a fourth image patch 206 with a low frequency on the horizontal axis and a low frequency on the vertical axis. Then, input the first image patch 202, the second image patch 203 and the third image patch 204 to an implicit degradation predictor 205 to generate an implicit degradation representation 103 and a contrasting learning loss 220. Moreover, input the implicit degradation representation 103 to an explicit kernel estimator 207 to generate an explicit kernel 105 and a kernel loss 222. Additionally input the implicit degradation representation 103 to a modulator 507 of a modulated network 505 to generate a tensor 228, and input the low resolution image 101 to a feature encoder 405 to generate an embedded feature 406. Then, input the embedded feature 406 to a synthesizer 508 to generate a synthesized feature. Then, input the tensor 228, coordinates of each low resolution image patch 201, and the synthesized feature to an implicit neural representation 214 to generate a first super resolution image 107 with a low resolution size and a second super resolution image 108 with a high resolution size. After that, perform convolution on the explicit kernel 105 and the first super resolution image to generate a convoluted image. Then, compare the convoluted image with the low resolution image 101 to generate a cycle loss 224, and compare a ground truth 225 of the high resolution image with the second super resolution image 108 with a high resolution size to generate a super loss 226. At last, minimize the contrasting learning loss 220 and the kernel loss 222 to train the implicit degradation predictor 205 and the explicit kernel estimator 207, and minimize the cycle loss 224 and the super loss 226 to train the modulated network 505, the feature encoder 405 and the implicit neural representation 214. The difference between the proposed super resolution model 500 and the proposed super resolution model 20 is that in the proposed super resolution model 500, the implicit degradation representation 103 is inputted to the modulated network 505 to generate the tensor 228 and that the embedded feature 406 is inputted to a synthesizer 508 to generate a synthesized feature.

In conclusion, the embodiments according to the present invention show a solution to the arbitrary scale blind super resolution problem. The super resolution images as shown in FIG. 3 generated by the proposed super resolution model are more similar to the ground truths of high resolution images 360, 370, 380 than the super resolution images generated by other models. Therefore, the embodiments provide an optimal solution for developing a super resolution image from a low resolution image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method for generating a high resolution image from a low resolution image comprising:
   retrieving a plurality of low resolution image patches from the low resolution image;
   performing discrete wavelet transform on each low resolution image patch to generate a first image patch with a high frequency on a horizontal axis and a high frequency on a vertical axis, a second image patch with a high frequency on the horizontal axis and a low frequency on the vertical axis, and a third image patch with a low frequency on the horizontal axis and a high frequency on the vertical axis;
   inputting the first image patch, the second image patch and the third image patch to an implicit degradation predictor to generate an implicit degradation representation and a contrasting learning loss;
   inputting the implicit degradation representation to an explicit kernel estimator to generate an explicit kernel and a kernel loss;
   inputting the implicit degradation representation and the low resolution image to a plurality of residual groups of an arbitrary-scale super resolution module to generate a tensor;
   inputting the tensor, coordinates of the each low resolution image patch, and a cell size of the each low resolution image patch to an implicit neural representation of the arbitrary-scale super resolution module to generate a super resolution image with a low resolution size and a super resolution image with a high resolution size;
   performing convolution on the explicit kernel and the super resolution image with a low resolution size to generate a convoluted image;
   comparing the convoluted image with the low resolution image to generate a cycle loss;
   comparing a ground truth of the high resolution image with the super resolution image with a high resolution size to generate a super loss;
   minimizing the contrasting learning loss and the kernel loss to train the implicit degradation predictor and the explicit kernel estimator; and
   minimizing the cycle loss and the super loss to train the arbitrary-scale super resolution module.

2. The method of claim 1 wherein the explicit kernel estimator comprises fully connected layers, and a plurality of convolution filters.

3. The method of claim 2 wherein the plurality of convolution filters comprise an 11×11 convolution filter, a 7×7 convolution filter, a 5×5 convolution filter, and a 1×1 convolution filter.

4. The method of claim 3 wherein inputting the implicit degradation representation to the explicit kernel estimator to generate the explicit kernel and the kernel loss comprises:
   projecting the implicit degradation representation to a lower dimension using two of the fully connected layers to generate a representation with the lower dimension;
   processing the representation with the lower dimension through four of the fully connected layers to generate a processed representation;
   reshaping the processed representation to generate four reshaped representations;
   performing convolutions on a 41×41 identity kernel with each of the four reshaped representations through the 11×11 convolution filter, the 7×7 convolution filter, the 5×5 convolution filter, and the 1×1 convolution filter respectively to derive the explicit kernel.

5. The method of claim 1 wherein inputting the implicit degradation representation to the explicit kernel estimator to generate the explicit kernel and the kernel loss comprises:
   comparing the explicit kernel with a ground truth of an ideal kernel to generate the kernel loss.

6. The method of claim 1 wherein:
   each of the residual groups comprises fully connected layers, a sigmoid function, and a residual block; and
   inputting the implicit degradation representation and the low resolution image to the plurality of residual groups to generate the tensor comprises:
      inputting the implicit degradation representation to fully connected layers of a first residual group of the plurality of residual groups to generate a first representation output of the first residual group;
      inputting the first representation output of the first residual group to a sigmoid function to generate a second representation output of the first residual group; and inputting the low resolution image and the second representation output to a residual block of the first residual group to generate a first residual output.

7. The method of claim 6 wherein:
the residual block comprises a plurality of convolution layers, a channel-wise weighting layer, and an add layer; and
inputting the low resolution image and the second representation output to the residual block of the first residual group to generate the first residual output comprises:
   inputting the low resolution image to the plurality of convolution layers to generate a convoluted result;
   performing channel-wise weighting on the convoluted result in the channel-wise weighting layer according to the second representation output to generate a weighted result; and
   adding the weighted result with the low resolution image in the add layer to generate the first residual output.

8. The method of claim 6 wherein inputting the implicit degradation representation and the low resolution image to the plurality of residual groups to generate the tensor further comprises:
   inputting the implicit degradation representation to fully connected layers of an nth residual group of the plurality of residual groups to generate a first representation output of the nth residual group;
   inputting the first representation output of the nth residual group to the sigmoid function to generate a second representation output of the nth residual group; and
   inputting the (n−1)th residual output and the second representation output of the nth residual group to a residual block of the nth residual group to generate an nth residual output;
   wherein n is an integer, and $1 < n \leq N$.

9. The method of claim 8 wherein:
the residual block comprises a plurality of convolution layers, a channel-wise weighting layer, and an add layer;
inputting the (n−1)th residual output and the second representation output of the nth residual group to the residual block of the nth residual group to generate the nth residual output comprises:
   inputting the (n−1)th residual output to the plurality of convolution layers to generate a convoluted result;
   performing channel-wise weighting on the convoluted result in the channel-wise weighting layer according to the second representation output of the nth residual group to generate a weighted result; and
   adding the weighted result with the (n−1)th residual output in the add layer to generate the nth residual output; and
an Nth residual output is the tensor.

10. The method of claim 1 wherein performing discrete wavelet transform on the each low resolution image patch further generates a fourth image patch with a low frequency on the horizontal axis and a low frequency on the vertical axis.

11. A method for generating a high resolution image from a low resolution image comprising:
   retrieving a plurality of low resolution image patches from the low resolution image;
   performing discrete wavelet transform on each low resolution image patch to generate a first image patch with a high frequency on a horizontal axis and a high frequency on a vertical axis, a second image patch with a high frequency on the horizontal axis and a low frequency on the vertical axis, and a third image patch with a low frequency on the horizontal axis and a high frequency on the vertical axis;
   inputting the first image patch, the second image patch and the third image patch to an implicit degradation predictor to generate an implicit degradation representation and a contrasting learning loss;
   inputting the implicit degradation representation to an explicit kernel estimator to generate an explicit kernel and a kernel loss;
   inputting the implicit degradation representation to a hyper network to generate a tensor;
   inputting the low resolution image to a feature encoder to generate an embedded feature;
   inputting the tensor, coordinates of the each low resolution image patch, and the embedded feature to an implicit neural representation to generate a super resolution image with a low resolution size and a super resolution image with a high resolution size;
   performing convolution on the explicit kernel and the super resolution image with a low resolution size to generate a convoluted image;
   comparing the convoluted image with the low resolution image to generate a cycle loss;
   comparing a ground truth of the high resolution image with the super resolution image with a high resolution size to generate a super loss;
   minimizing the contrasting learning loss and the kernel loss to train the implicit degradation predictor and the explicit kernel estimator; and
   minimizing the cycle loss and the super loss to train the hyper network, the feature encoder and the implicit neural representation.

12. The method of claim 11 wherein the explicit kernel estimator comprises fully connected layers, and a plurality of convolution filters.

13. The method of claim 12 wherein the plurality of convolution filters comprise an 11×11 convolution filter, a 7×7 convolution filter, a 5×5 convolution filter, and a 1×1 convolution filter.

14. The method of claim 13 wherein inputting the implicit degradation representation to the explicit kernel estimator to generate the explicit kernel and the kernel loss comprises:
   projecting the implicit degradation representation to a lower dimension using two of the fully connected layers to generate a representation with the lower dimension;
   processing the representation with the lower dimension through four of the fully connected layers to generate a processed representation;
   reshaping the processed representation to generate four reshaped representations;
   performing convolutions on a 41×41 identity kernel with each of the four reshaped representations through the 11×11 convolution filter, the 7×7 convolution filter, the 5×5 convolution filter, and the 1×1 convolution filter respectively to derive the explicit kernel.

15. The method of claim 11 wherein inputting the implicit degradation representation to the explicit kernel estimator to generate the explicit kernel and the kernel loss comprises:
   comparing the explicit kernel with a ground truth of an ideal kernel to generate the kernel loss.

16. A method for generating a high resolution image from a low resolution image comprising:
   retrieving a plurality of low resolution image patches from the low resolution image;

performing discrete wavelet transform on each low resolution image patch to generate a first image patch with a high frequency on a horizontal axis and a high frequency on a vertical axis, a second image patch with a high frequency on the horizontal axis and a low frequency on the vertical axis, and a third image patch with a low frequency on the horizontal axis and a high frequency on the vertical axis;

inputting the first image patch, the second image patch and the third image patch to an implicit degradation predictor to generate an implicit degradation representation and a contrasting learning loss;

inputting the implicit degradation representation to an explicit kernel estimator to generate an explicit kernel and a kernel loss;

inputting the implicit degradation representation to a modulated network to generate a tensor;

inputting the low resolution image to a feature encoder to generate an embedded feature;

inputting the embedded feature to a synthesizer to generate a synthesized feature;

inputting the tensor, coordinates of the each low resolution image patch, and the synthesized feature to an implicit neural representation to generate a super resolution image with a low resolution size and a super resolution image with a high resolution size;

performing convolution on the explicit kernel and the super resolution image with a low resolution size to generate a convoluted image;

comparing the convoluted image with the low resolution image to generate a cycle loss;

comparing a ground truth of the high resolution image with the super resolution image with a high resolution size to generate a super loss;

minimizing the contrasting learning loss and the kernel loss to train the implicit degradation predictor and the explicit kernel estimator; and minimizing the cycle loss and the super loss to train the modulated network, the feature encoder and the implicit neural representation.

17. The method of claim 16 wherein the explicit kernel estimator comprises fully connected layers, and a plurality of convolution filters.

18. The method of claim 17 wherein the plurality of convolution filters comprise an 11×11 convolution filter, a 7×7 convolution filter, a 5×5 convolution filter, and a 1×1 convolution filter.

19. The method of claim 18 wherein inputting the implicit degradation representation to the explicit kernel estimator to generate the explicit kernel and the kernel loss comprises:

projecting the implicit degradation representation to a lower dimension using two of the fully connected layers to generate a representation with the lower dimension;

processing the representation with the lower dimension through four of the fully connected layers to generate a processed representation;

reshaping the processed representation to generate four reshaped representations;

performing convolutions on a 41×41 identity kernel with each of the four reshaped representations through the 11×11 convolution filter, the 7×7 convolution filter, the 5×5 convolution filter, and the 1×1 convolution filter respectively to derive the explicit kernel.

20. The method of claim 16 wherein inputting the implicit degradation representation to the explicit kernel estimator to generate the explicit kernel and the kernel loss comprises:

comparing the explicit kernel with a ground truth of an ideal kernel to generate the kernel loss.

* * * * *